(12) United States Patent
Chang et al.

(10) Patent No.: US 11,079,936 B2
(45) Date of Patent: Aug. 3, 2021

(54) 3-D STACKED MEMORY WITH RECONFIGURABLE COMPUTE LOGIC

(71) Applicant: SAMSUNG ELECTRONICS CO., LTD., Suwon-Si (KR)

(72) Inventors: Mu-Tien Chang, San Jose, CA (US); Prasun Gera, Atlanta, GA (US); Dimin Niu, Sunnyvale, CA (US); Hongzhong Zheng, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 608 days.

(21) Appl. No.: 15/143,248

(22) Filed: Apr. 29, 2016

(65) Prior Publication Data

US 2017/0255390 A1    Sep. 7, 2017

Related U.S. Application Data

(60) Provisional application No. 62/301,966, filed on Mar. 1, 2016.

(51) Int. Cl.
*G06F 3/06*      (2006.01)
*G06F 15/78*     (2006.01)
*G06F 9/30*      (2018.01)

(52) U.S. Cl.
CPC .......... *G06F 3/0605* (2013.01); *G06F 3/0611* (2013.01); *G06F 3/0625* (2013.01); *G06F 3/0635* (2013.01); *G06F 3/0659* (2013.01); *G06F 3/0673* (2013.01); *G06F 9/30196* (2013.01); *G06F 15/785* (2013.01); *Y02D 10/00* (2018.01)

(58) Field of Classification Search
CPC . G06F 3/06; G06F 9/30; G06F 3/0605; G06F 3/0611; G06F 3/0625; G06F 9/30196; G06F 3/0659; G06F 3/0673; G06F 3/0635; G06F 15/785; Y02D 10/00; Y02D 10/13
USPC .......................................................... 711/104
See application file for complete search history.

(56) References Cited

U.S. PATENT DOCUMENTS

| | | | |
|---|---|---|---|
| 8,064,739 B2 | 11/2011 | Binkert et al. | |
| 8,369,123 B2 | 2/2013 | Kang et al. | |
| 8,737,108 B2 | 5/2014 | Saraswat et al. | |
| 8,922,243 B2* | 12/2014 | Jayasena | H03K 19/1776 326/38 |
| 9,286,948 B2* | 3/2016 | Loh | G11C 5/02 |
| 9,959,929 B2* | 5/2018 | Resnick | G11C 7/1006 |
| 2005/0134308 A1* | 6/2005 | Okada | G06F 15/7867 326/39 |
| 2013/0032950 A1 | 2/2013 | Ware et al. | |
| 2014/0181427 A1* | 6/2014 | Jayasena | G06F 9/3004 711/154 |

OTHER PUBLICATIONS

"Hybrid Memory Cube Specification 2.0", 2014.*

(Continued)

*Primary Examiner* — David Yi
*Assistant Examiner* — Zubair Ahmed
(74) *Attorney, Agent, or Firm* — Lewis Roca Rothgerber Christie LLP (57) ABSTRACT

A 3D-stacked memory device including: a base die including a plurality of switches to direct data flow and a plurality of arithmetic logic units (ALUs) to compute data; a plurality of memory dies stacked on the base die; and an interface to transfer signals to control the base die.

21 Claims, 7 Drawing Sheets

(56) References Cited

OTHER PUBLICATIONS

Ahmed; HAL archives-ouvertes; eFPGAs: Architectural Explorations, Systems Integration & a Visionary Industrial Survey of Programmable Technologies; Sep. 16, 2011; 192 Sheets.

* cited by examiner

| 63 | 61 60 | 58 57 | 24 23 22 | 12 11 | 7 6 | 0 |
|---|---|---|---|---|---|---|
| CUB[2:0] | RES[2:0] | ADRS[33:0] | RES | TAG[10:0] | LNG[4:0] | CMD[6:0] |

FIG. 5D

| 63 | 32 31 | 29 28 | 26 25 | 22 21 20 | 18 17 | 9 8 | 0 |
|---|---|---|---|---|---|---|---|
| CRC[31:0] | RTC[2:0] | SLID[2:0] | RES[3:0] | Pb SEQ[2:0] | FRP[8:0] | RRP[8:0] |

FIG. 5E

| 63 | 61 60 | 42 41 | 39 38 | 34 33 32 | 23 22 | 12 11 | 7 6 | 0 |
|---|---|---|---|---|---|---|---|---|
| CUB[2:0] | RES[18:0] | SLID[2:0] | RES[4:0] | AF RES[9:0] | TAG[10:0] | LNG[4:0] | CMD[6:0] |

FIG. 5F

| 63 | 32 31 | 29 28 | 22 21 20 | 18 17 | 9 8 | 0 |
|---|---|---|---|---|---|---|
| CRC[31:0] | RTC[2:0] | ERRSTAT[6:0] | DINV[0] SEQ[2:0] | FRP[8:0] | RRP[8:0] |

3-D STACKED MEMORY WITH RECONFIGURABLE COMPUTE LOGIC

CROSS-REFERENCE TO RELATED APPLICATION

This utility patent application claims priority to and the benefit of U.S. Provisional Patent Application Ser. No. 62/301,966, filed Mar. 1, 2016, entitled "3D-STACKED MEMORY WITH RECONFIGURABLE COMPUTE LOGIC," the entire content of which is incorporated herein by reference.

BACKGROUND

1. Field

One or more aspects of example embodiments of the present invention relate to a 3D-stacked memory device with reconfigurable compute logic.

2. Description of the Related Art 3D-stacked (3DS) memory is a high density and high performance memory structure that generally includes multiple layers of memory dies stacked on a base die that are interconnected using through silicon vias (TSVs). The base die is generally limited to performing support logic for reading and writing data to the memory dies. Examples of 3DS memory include hybrid memory cube (HMC) and high bandwidth memory (HBM).

Generally, a processor and memory are separate, and thus, to transfer data therebetween results in memory access latency and high power consumption. Recently, implementing processing capabilities closer to the memory has been the trend, so that the processor's memory capacity may be increased, and memory access latency may be decreased.

However, these solutions focus mainly on general purpose processors (e.g., CPUs or CPUs) or application specific processors (e.g., ASICs). While general purpose processors provide flexibility, they are often more complex, costly, and use high power consumption when compared to application specific processors. On the other hand, application specific processors packaged with memory are less flexible, often resulting in application-specific components. Moreover, while some solutions focus on data reduction/acceleration logic having efficiency and flexibility, they do not compute data.

The above information disclosed in this Background section is for enhancement of understanding of the background of the invention, and therefore, it may contain information that does not constitute prior art.

SUMMARY

One or more aspects of example embodiments of the present invention are directed toward a 3D-stacked memory device including a base die that is reconfigurable to compute data.

One or more aspects of example embodiments of the present invention are directed toward an interface for a 3D-stacked memory device including a base die that is reconfigurable to compute data.

According to one or more example embodiments of the present invention, a 3D-stacked memory device includes: a base die including a plurality of switches configured to direct data flow and a plurality of arithmetic logic units (ALUs) configured to compute data; a plurality of memory dies stacked on the base die; and an interface configured to transfer signals to control the base die.

In an embodiment, the base die may further include a program memory, the program memory being configured to be controlled by an external host through the interface, to configure the switches, and to control operations of the ALUs.

In an embodiment, the interface may include: a request link configured to transmit a request packet from the host to the base die; and a response link configured to transmit a response packet from the base die to the host.

In an embodiment, the request packet may include configuration instructions and/or commands to instruct the switches and the ALUs to compute the data.

In an embodiment, the request packet may include reserved bits to be utilized to transmit the configuration instructions and/or the commands to the base die.

In an embodiment, the request packet may include a header and a tail, the tail comprising bits utilized to transmit the configuration instructions and/or the commands to the base die.

In an embodiment, the interface may include: a control bus configured to transmit commands from a host to the base die; and a data bus configured to transmit data between the host and the base die.

In an embodiment, the commands may include a mode register set command (MRS command) to configure the 3DS memory device to operate in a PIM mode to compute the data.

In an embodiment, the commands may include a memory command, and the base die is configured to translate the memory command to compute the data, when operating in the PIM mode.

In an embodiment, the base die may be configured to perform the memory command, when operating in a normal mode.

In an embodiment, the memory command may include a DRAM command.

According to one or more example embodiments of the present invention, a method of operating a 3D-stacked memory device including a base die including a plurality of switches and a plurality of arithmetic logic units (ALUs), a plurality of memory dies stacked on the base die, and an interface configured to control the base die, includes: configuring the switches to direct data flow according to configuration instructions; controlling operations of the ALUs to compute data according to logic commands; and storing the computed data in the memory dies.

In an embodiment, the configuration instructions and the logic commands may be embedded in a request packet, and the method may further include: receiving the request packet through a request link of the interface from a host; and decoding the request packet to identify the configuration instructions and the logic commands.

In an embodiment, the method may further include: transmitting a response packet through a response link of the interface to the host.

In an embodiment, the request packet may include reserved bits for the configuration instructions and/or the logic commands.

In an embodiment, the request packet may include a header and a tail, the tail comprising bits for the configuration instructions and/or the logic commands.

In an embodiment, the method may further include: receiving a mode register set command through a control bus of the interface from a host; and in response to receiving the mode register set command, configuring a PIM mode to compute the data.

In an embodiment, the method may further include: receiving a first memory command from the host through the control bus; translating the first memory command into the logic commands; and computing the data according to the logic commands.

In an embodiment, the method may further include: configuring a normal mode; receiving a second memory command from the host through the control bus; and performing a memory function according to the second memory command.

According to one or more example embodiments of the present invention, an interface of a memory device including a processor in memory, includes: a control bus configured to transfer commands from an external host to the memory device; and a data bus configured to transfer data between the memory device and the host; wherein the interface is configured to transfer the commands to set the memory device to operate in a PIM mode to compute data, and to set the memory device to operate in a normal mode to perform memory functions, and the memory device is configured to translate memory commands into logic commands to compute the data according to the logic commands when in the PIM mode, and to perform the memory functions according to the memory commands when in the normal mode.

BRIEF DESCRIPTION OF THE DRAWINGS

The above and other aspects and features of the present invention will become more apparent to those skilled in the art from the following detailed description of the example embodiments with reference to the accompanying drawings.

DETAILED DESCRIPTION

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

According to one or more embodiments of the present invention, reconfigurable compute logic may be implemented on a base die of a 3DS memory device. Generally, the 3DS memory device is a slave device, so compute is performed on the processor (e.g., CPU or GPU) side, and data is transferred back and forth between the processor and memory. The base die is generally an intermediate between a host (e.g., CPU or memory controller) and the memory dies. Its purpose is to provide the necessary interface and logic, such that the commands sent by the host can be understood by memory. In the case of HMC, the based die may also encode response from the memory die, such that information transferred back to the host can be understood.

However, 3DS memory generally has high bandwidth and low latency between the base die and the memory dies, and available semiconductor (e.g., silicon) real estate on the base die may be suitable to implement processor in memory (PIM) on the base die to compute data. By implementing PIM on the base die according to one or more embodiments of the present invention, the compute logic and memory are tightly coupled, and thus, data transfer time and/or energy consumption may be reduced.

Figure 1:
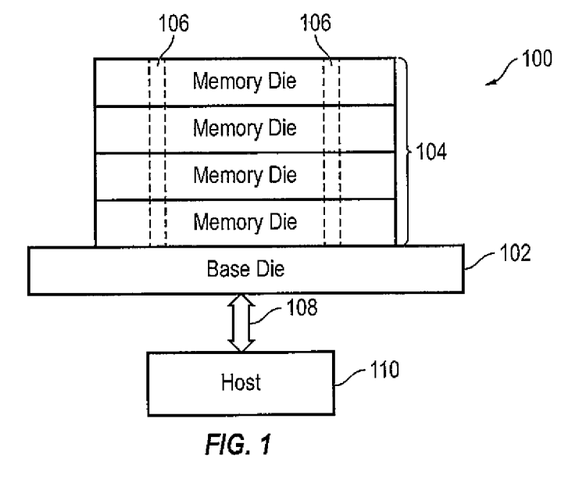
FIG. 1 is a schematic diagram illustrating a cross-sectional view of a 3D-stacked memory device, according to an example embodiment of the present invention.

FIG. 1 is a diagram illustrating a cross-sectional view of a 3D-stacked memory device, according to an example embodiment of the present invention.

Referring to FIG. 1, a 3DS memory device 100 includes a base die 102, a plurality of memory dies 104 stacked on the base die 102, through silicon vias (TSVs) 106, and an interface 108 between the 3DS memory device 100 and a host (e.g., an external host processor or controller such as a CPU or a GPU) 110.

The memory dies 104 may be implemented as, for example, dynamic random access memory (DRAM). However, the present invention is not limited thereto, and the memory dies 104 may be implemented as any suitable memory that may be implemented in a 3D-stacked structure. The TSVs 106 connect (e.g., interconnect) the memory dies 104 and the base die 102, and transfer data between the memory dies 104 and the base die 102.

According to some embodiments of the present invention, the base die 102 includes a logic array, discussed in more detail below, including a plurality of switches and a plurality of arithmetic logic units (ALUs). As will be described in more detail with reference to FIG. 2, the logic array may compute data, and may be reconfigured real time via PIM instructions received from the host 110 through the interface 108. That is, the host 110 may communicate (e.g., directly communicate) with the base die 102 through the interface 108, and the base die 102 may communicate (e.g., directly communicate) with the memory dies 104 to perform the compute logic.

Figure 2:
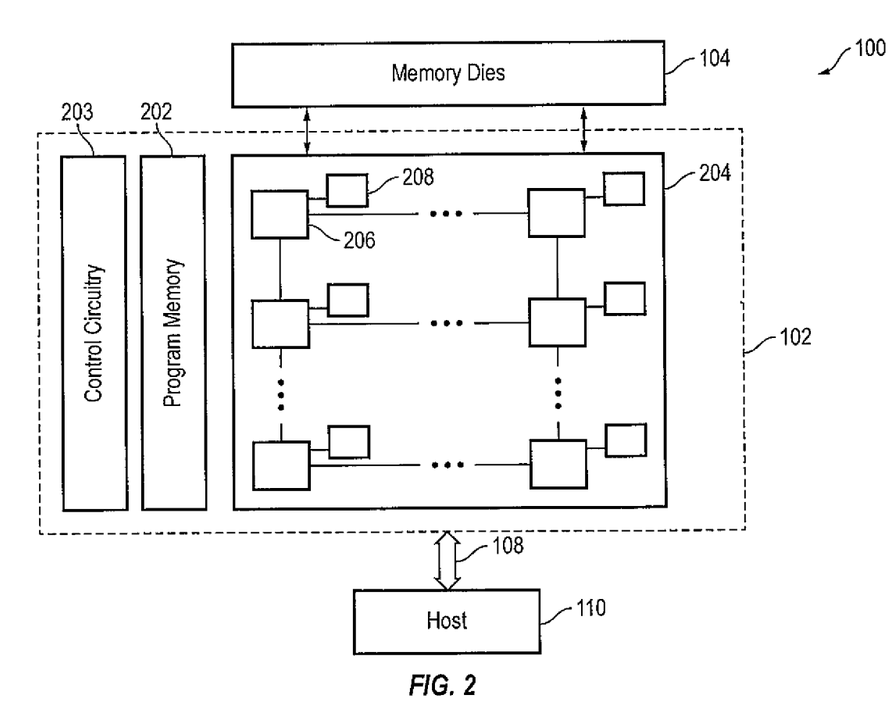
FIG. 2 is a diagram illustrating the base die shown in FIG. 1, according to an example embodiment of the present invention.

FIG. 2 is a diagram illustrating further detail of the base die 102 of the 3DS memory device 100 shown in FIG. 1, according to an example embodiment of the present invention.

Referring to FIG. 2, the base die 102 includes program memory 202 and a logic array 204. The logic array 204 includes a plurality of switches 206 and a plurality of ALUs 208. The program memory 202 receives control instructions from the host 110 through the interface 108, controls access to the memory dies 104, configures the switches 206, and instructs operation of the ALUs 208. The switches 206 create data paths and direct data flow, and the ALUs 208 compute data.

According to an embodiment of the present invention, the program memory 202 may be implemented as, for example, static random access memory (SRAM). However, the present invention is not limited thereto, and the program memory 202 may be implemented as any suitable program memory on the base die 102.

In more detail, the program memory 202 receives control instructions from the host 110. The control instructions may include commands for configuring the switches 206, accessing the memory dies 104, and operating the ALUs 208. The commands for accessing the memory dies 104 and operating the ALUs 208 may be similar to or the same as CPU instructions (e.g., LOAD, STORE, ADD, MULTIPLY, etc.).

The program memory 202 stores configuration data and instructions, and may store multiple configuration data and instructions at any given time to allow, operations to pipeline efficiently. However, the present invention is not limited thereto. For example, the configuration data and/or the instructions may be stored in the memory dies as secondary storage (e.g., when the program memory 202 is full or substantially full).

For example, during system initialization, the host may read from the memory device to determine the size of the program memory 202, and the capacity (e.g., maximum capacity) of the memory dies 104 that can be used for storing the configuration data and instructions. Because the capacity for storing the configuration data is determined by the memory device, there may be a case where none of the memory dies 104 can be used to store configuration data and instructions. However, in the case where the memory dies 104 store the configuration data and instructions (e.g., because the program memory 202 is full), the base die 102 may have logic that directs configuration from the host to the memory dies (e.g., bypassing the program memory 202), and logic to fetch configuration from the memory dies 104 to the program memory 202.

The size of the program memory 202 may depend on the number of the switches 206, the number of the ALUs 208, and/or the size of the memory dies 104. Further, a control circuitry (e.g., a controller) 203 may be provided to read/write the program memory 202, and to effectuate changes thereto.

The program memory 202 may utilize the configuration data to configure the switches 206 to create data paths and direct data flow. The program memory 202 may utilize memory instructions to access the memory dies 104, and may utilize ALU instructions to compute data. The ALUs may support one or more arithmetic/logic operations, for example, ADD, MULTIPLE, DIVIDE, COMPARE, SHIFT, AND, OR, XOR, etc., to compute data.

While the switches 206 and the ALUs 208 are shown in FIG. 2 as having a one-to-one relationship, the present invention is not limited thereto. For example, in some embodiments, an ALU 208 may be associated with multiple switches 206. In some embodiments, a plurality of ALUs 208 may be associated with a single or a plurality of switches 206.

Figure 3:
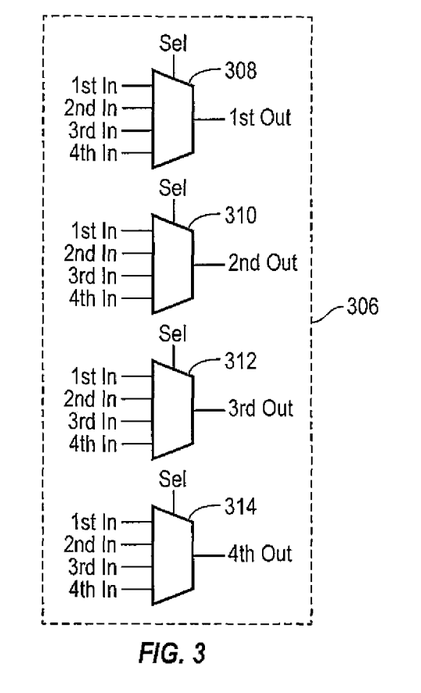
FIG. 3 is a diagram illustrating a switch shown in FIG. 2, according to an example embodiment of the present invention.

FIG. 3 is a diagram illustrating a switch shown in FIG. 2, according to an example embodiment of the present invention.

Referring to FIGS. 2 and 3, each of the switches 206 may direct data to flow from a direction to any of a plurality of directions. For example, assuming that a switch 306 from among the switches 206 may direct data to flow in a first direction, a second direction opposite the first direction, a third direction crossing the first direction, and a fourth direction opposite the third direction, the switch 306 may be implemented as a four-way switch including a plurality of multiplexers (MUXs). When the switch 306 is a four-way switch, the plurality of MUXs may include first to fourth MUXs, each of the MUXs corresponding to a direction. However, the present invention is not limited thereto, and the switches 206 may be implemented as any suitable switches capable of directing data to flow in any number of directions.

For convenience, the switch 306 shown in FIG. 3 is implemented as a four-way switch including first to fourth MUXs 308, 310, 312, and 314 to direct data to flow in the first to fourth directions, but the present invention is not limited thereto. For example, a number of directions that the switch 306 may transmit the data may be more or less than four, and a number of the MUXs may correspond to the number of directions.

In more detail, the switch 306 in FIG. 3 includes the first to fourth MUXs 308 to 314. Each of the MUXs 308 to 314 may direct data to flow in any one of the first to fourth directions. For example, the first MUX 308 may direct the data in the first direction via a first output terminal 1st_OUT, the second MUX 310 may direct the data in the second direction via a second output terminal 2nd_OUT, the third MUX 312 may direct the data in the third direction via a third output terminal 3rd_OUT, and the fourth MUX 314 may direct the data in the fourth direction via a fourth output terminal 4th_OUT.

Each of the MUXs 308 to 314 may include a first input terminal 1st_IN to receive data from the first direction, a second input terminal 2nd_IN to receive data from the second direction, a third input terminal 3rd_IN to receive data from the third direction, and a fourth input terminal 4th_IN to receive data from the fourth direction. The first input terminals 1st_IN of each of the MUXs 308 to 314 may be electrically coupled to each other. The second input terminals 2nd_IN of each of the MUXs 308 to 314 may be electrically coupled to each other. The third input terminals 3rd_IN of each of the MUXs 308 to 314 may be electrically coupled to each other. The fourth input terminals 4th_IN of each of the MUXs 308 to 314 may be electrically coupled to each other.

In some embodiments, signals generated by a corresponding ALU may be looped back to the same ALU. In this case, the signals may loop back via a corresponding MUX, or the signal may loop back just inside the corresponding ALU. In the case where the signal loops back via the corresponding MUX, the MUX may further include a fifth input terminal, and the fifth input terminal may be electrically coupled to the output terminal of the MUX to receive data flowing in opposite directions. However, the present invention is not limited thereto.

Each of the MUXs 308 to 314 may further include a selection terminal SEL. The selection terminal SEL enables the corresponding MUX to direct the data towards the corresponding direction. For example, assuming that the switch 306 wants to direct data from the third direction to the first direction, the selection terminal SEL enables the first MUX 308 (and/or disables the second to fourth MUXs 310 to 314), and the first MUX 308 outputs via its output terminal 1st_OUT the data received at its third input terminal 3rd_IN to the first direction.

Figure 4A:
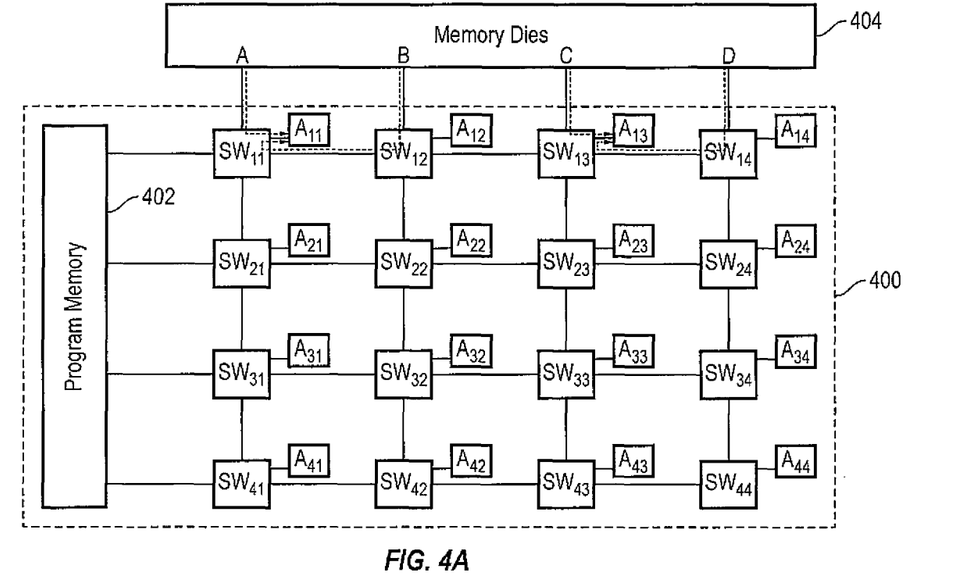
FIGS. 4A-4C are diagrams illustrating an example logic operation in a 4×4 logic array of the 3DS memory device, according to an embodiment of the present invention.
Figure 4B:
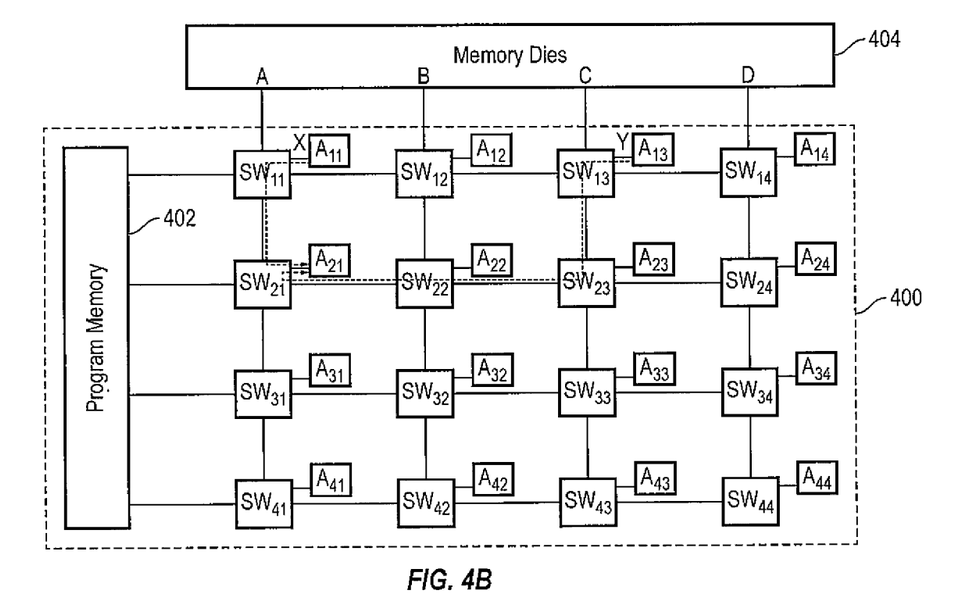
Figure 4C:
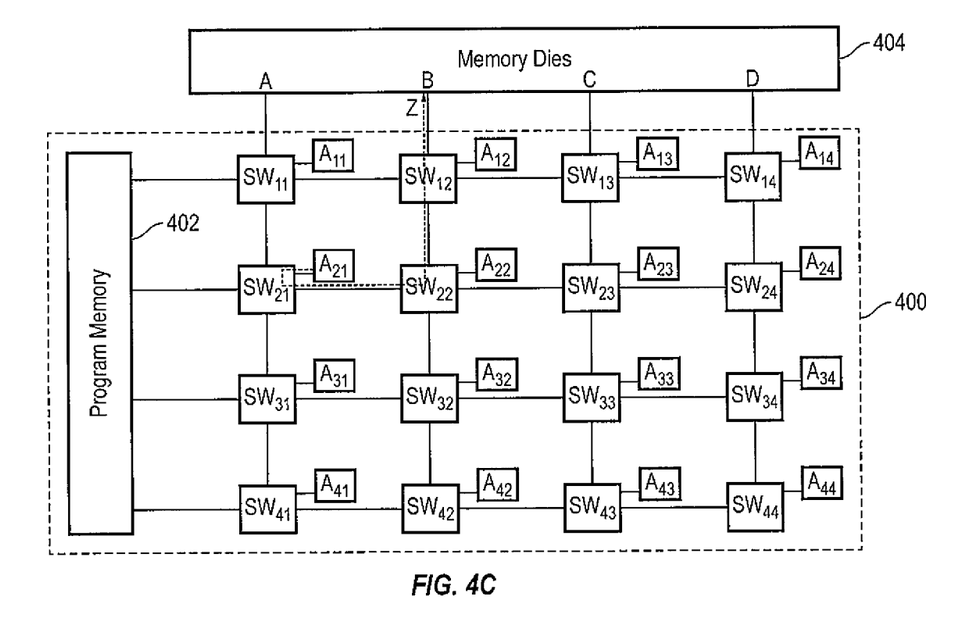

FIGS. 4A-4C are diagrams illustrating an example logic operation in a 4×4 logic array of the 3DS memory device, according to an embodiment of the present invention. The example shown in FIGS. 4A to 4C assumes that the goal is to sum four numbers A, B, C, and D, and to store the sum in the memory dies 404. FIG. 4A illustrates a first cycle of the operation, FIG. 4B illustrates a second cycle of the operation, and FIG. 4C illustrates a third cycle of the operation. While FIGS. 4A to 4C illustrate a simplified example operation of the 4×4 logic array, the present invention is not limited thereto.

In FIGS. 4A to 4C, the base die 400 includes a 4×4 logic array of switches $SW_{11}$ to $SW_{44}$ and ALUs $A_{11}$ to $A_{44}$, and the program memory 402 to configure and instruct the switches $SW_{11}$ to $SW_{44}$ and the ALUs $A_{11}$ to $A_{44}$.

Referring to FIG. 4A, during the first cycle, the program memory 402 configures the switches $SW_{11}$ and $SW_{12}$ and the memory dies 404 to load the values of A and B from the memory dies 404 to the ALU $A_{11}$, and configures the switches $SW_{13}$ and $SW_{14}$ and the memory dies 404 to load the values of C and D from the memory dies 404 into the ALU $A_{13}$. The program memory 402 instructs the ALU $A_{11}$ to ADD the values of A and B, and instructs the ALU $A_{13}$ to ADD the values of C and D.

Referring to FIG. 4B, during the second cycle, the program memory 402 configures the switches $SW_{11}$ and $SW_{21}$ to transmit a result X of the sum of A and B from the ALU $A_{11}$ to the ALU $A_{21}$, and configures the switches $SW_{13}$, $SW_{21}$, $SW_{22}$, and $SW_{23}$ to transmit a result Y of the sum of C and D from the ALU $A_{13}$ to the ALU $A_{21}$. The program memory 402 instructs the ALU $A_{21}$ to ADD the values of X and Y.

Referring to FIG. 4C, during the third cycle, the program memory 402 configures the switches $SW_{12}$, $SW_{21}$, and $SW_{22}$ and the memory dies 404 to store a result Z of the sum of X and Y from the ALU $A_{21}$ to the memory dies 404.

Accordingly, the switches $SW_{11}$ to $SW_{44}$ may create data paths and direct data flow, and the ALUs $A_{11}$ to $A_{44}$ may compute data.

Referring again to FIGS. 1 and 2, the host 110 may send configuration instructions and commands for the base die 102 (e.g., the switches 206 and the ALUs 208) to compute data through the interface 108 between the 3DS memory device 100 and the host 110. In some embodiments, the interface 108 may include response and request links (e.g., asynchronous response and request links). In some embodiments, the interface may include control and data buses. For example, according to one or more embodiments of the present invention, the interface 108 may include the interface of an HMC device or an HBM device that is modified to transmit PIM instructions for the base die 102 (e.g., the switches 206 and the ALUs 208 on the base die 102) to compute data. However, the present invention is not limited thereto, and the interface 108 may include any suitable interface to configure and instruct the base die 102 to compute data.

Figure 5A:
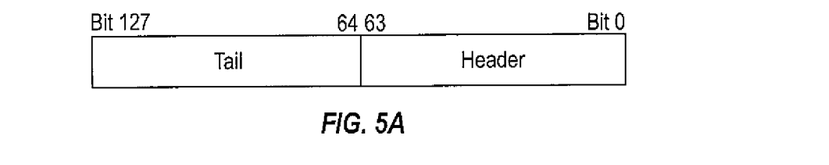
FIGS. 5A-5F are diagrams illustrating example packets for an interface including response and request links according to an embodiment of the present invention.
Figure 5B:
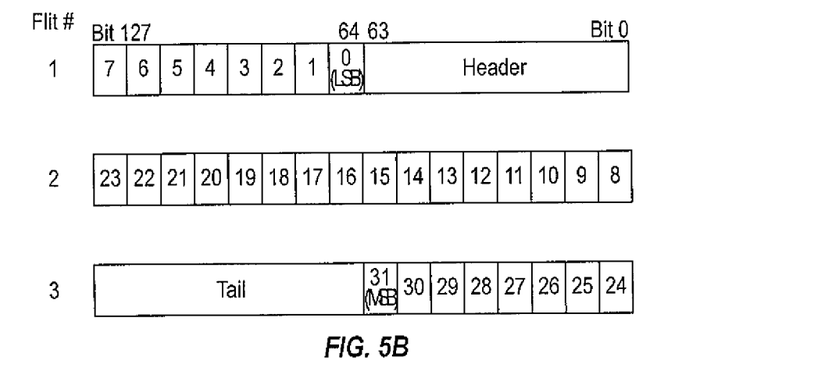
Figure 5C:
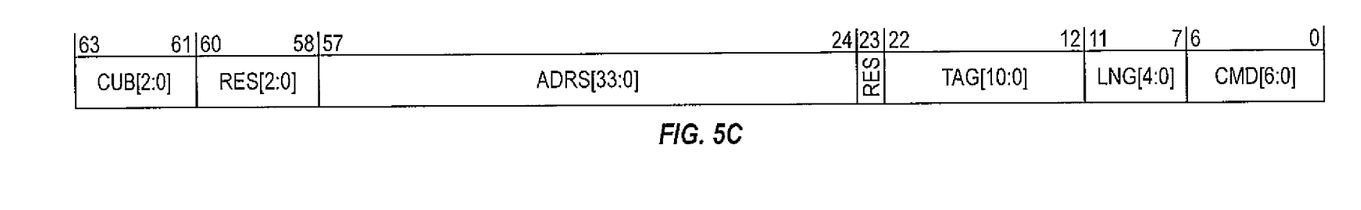
Figure 5D:
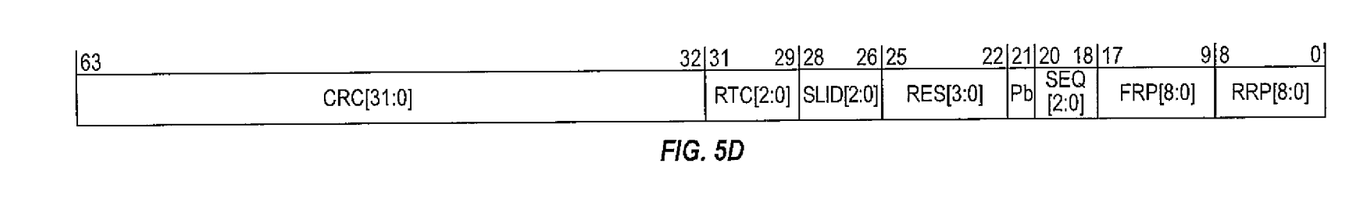
Figure 5E:
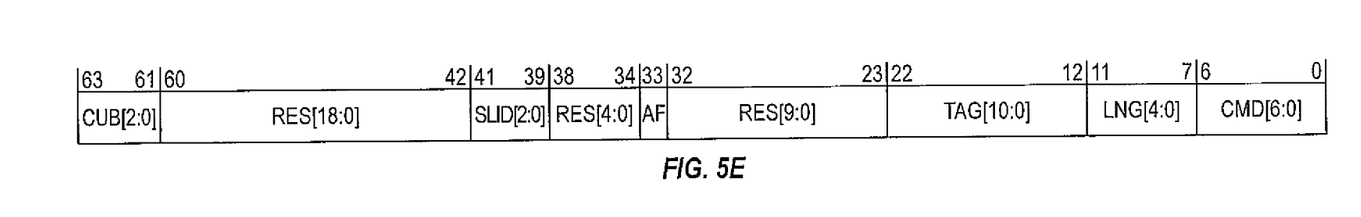
Figure 5F:
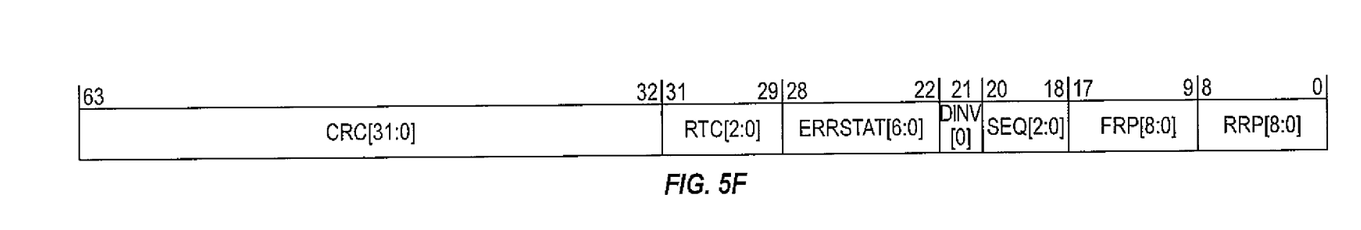

FIGS. 5A to 5F illustrate example packets for an interface including response and request links according to an embodiment of the present invention. FIG. 5A illustrates a packet with no data, FIG. 5B illustrates a packet with data, FIG. 5C illustrates a request packet header layout, FIG. 5D illustrates a request packet tail layout, FIG. 5E illustrates a response packet header layout, and FIG. 5F illustrates a response packet tail layout.

When the interface includes the response and request links (e.g., asynchronous response and request links), such as the interface for an HMC device, the request link sends packets from the host to the 3DS memory device, and the response link sends packets from the 3DS memory device to the host. The host sends a packet including address information, commands, and/or data to the 3DS memory device via a request packet. The 3DS memory device responds to the host via a response packet. Each of the host and the 3DS memory device may include an encoder and a decoder to process the packets. Configuration instructions and commands may be embedded in the packets, and the 3DS memory device may decode the configuration instructions and the commands to configure the base die 102 (e.g., the switches 206 and the ALUs 208 on the base die 102) to compute data.

Referring to FIGS. 5A and 5B, a packet generally includes a header and a tail. For example, when the packet (e.g., 128-bits) does not include data, the header may be allocated to bit 0 to bit 63, and the tail may be allocated to bit 64 to bit 127. When the packet includes data (e.g., 32B data payload), the packet is serialized into a transmission unit Flit (e.g., a Flit is 128-bits), and each numbered data field represents a byte with bit positions [7(MSBO: 0(LSB)].

Referring to FIG. 5C, when the interface 108, for example, is the same or substantially the same as that of the HMC device, the request packet header layout includes a plurality of fields. The fields include cube ID CUB (e.g., bit range [63:61]), reserved RES (e.g., bit range [60:58]), address ADRS (e.g., bit range [57:24]), reserved RES (e.g., bit range [23]), tag TAG (e.g., bit range [22:12]), packet length LNG (e.g., bit range [11:7]), and command CMD (e.g., bit range [6:0]).

The request packet header fields may be defined, for example, in Table 1 below (e.g., for the HMC device).

TABLE 1

| Name | Field Label | Bit Count | Bit Range | Function |
|---|---|---|---|---|
| Cube ID | CUB | 3 | [63:61] | CUB field used to match request with target cube. The internal Cube ID Register defaults to the value read on external CUB pins of each HMC device. |
| Reserved | RES | 3 | [60:58] | Reserved: These bits are reserved for future address or Cube ID expansion. The responder will ignore bits in this field from the requester except for including them in the CRC calculation. The HMC can use portions of this field range internally. |
| Address | ADRS | 34 | [57:24] | Request address. For some commands, control fields are included within this range. |
| Reserved | RES | 1 | [23] | |
| Tag | TAG | 11 | [22.12] | Tag number uniquely identifying this request. |
| Packet Length | LNG | 5 | [11:7] | Length of packet in FLITs (1 FLIT is 128 bits). Includes header, any data payload, and tail. |
| Command | CMD | 7 | [6:0] | Packet command. |

Referring to FIG. 5D, when the interface 108, for example, is the same or substantially the same as that of the HMC device, the request packet tail layout includes a plurality of fields. The fields include cyclic redundancy check CRC (e.g., bit range [63:32]), return token count RTC (e.g., bit range [31:29]), source ling ID SLID (e.g., bit range [28:26]), reserved RES (e.g., bit range [25:22]), poison bit Pb (e.g., bit range [21]), sequence number SEQ (e.g., bit range [20:18], forward retry pointer FRP (e.g., bit range [17:9]), and return retry pointer RRP (e.g., bit range [8:0]).

The request packet tail fields may be defined, for example, in Table 2 below (e.g., for the HMC device).

TABLE 2

| Name | Field Label | Bit Count | Bit range | Function |
|---|---|---|---|---|
| Cyclic redundancy check | CRC | 32 | [63:32] | The error-detecting code field that covers the entire packet. |
| Return token count | RTC | 3 | [31:29] | Return token count for transaction-layer flow control. In the request packet tail, the RTC contains the encoded value for tokens that represent available space in the requester's input buffer. |

TABLE 2-continued

| Name | Field Label | Bit Count | Bit range | Function |
|---|---|---|---|---|
| Source Link ID | SLID | 3 | [28:26] | Used to identify the source link for response routing. The incoming value of this field is ignored by the HMC. Internally, HMC overwrites this field and uses the value for response routing; refer to the description of the SLID field in the response header. |
| Reserved | RES | 4 | [25:22] | Reserved: The responder will ignore bits in this field from the requester except for including them in the CRC calculation. The HMC can use portions of this field range internally. |
| Poison bit | Pb | 1 | 21 | Poison bit: the DRAM addresses to be written in this request will be poisoned by writing a special poison code to alternating 16-byte blocks being written, starting with the first requested 16-byte block. The other 16-byte blocks within this request are written normally using the corresponding write data included in the data payload. |
| Sequence number | SEQ | 3 | [20:18] | Incrementing value for each packet transmitted, except for PRET and IRTRY packets. |
| Forward retry pointer | FRP | 9 | [17:9] | Retry pointer representing this packet's position in the retry buffer. |
| Return retry pointer | RRP | 9 | [8:0] | Retry pointer being returned for other side of link. |

Referring to FIG. 5E, when the interface 108, for example, is the same or substantially the same as that of the HMC device, the response packet header layout includes a plurality of fields. The fields include cube ID CUB (e.g., bit range [63:61]), reserved RES (e.g., bit range [60:42]), source link ID SLID (e.g., bit range [41:39]), reserved RES (e.g., bit range [38:34]), Atomic flag AF (e.g., bit range [33]), reserved RES (e.g., bit range [32:23]), tag TAG (e.g., bit range [22:12]), packet length LNG (e.g., bit range [11:7]), and command CMD (e.g., bit range [6:0]).

The response packet header fields may be defined, for example, in Table 3 below (e.g., for the HMC device).

Referring to FIG. 5F, when the interface 108, for example, is the same or substantially the same as that of the HMC device, the response packet tail layout includes a plurality of fields. The fields include cyclic redundancy check CRC (e.g., bit range [63:32]), return token counts RTC (e.g., bit range [31:29]), error status ERRSTAT (e.g., bit range [28:22]), data invalid DINV (e.g., bit range [21]), sequence number SEQ (e.g., bit range [20:18], forward retry pointer FRP (e.g., bit range [17:9]), and return retry pointer RRP (e.g., bit range [8:0]).

The response packet tail fields may be defined, for example, in Table 4 below (e.g., for the HMC device).

TABLE 3

| Name | Field Label | Bit Count | Bit range | Function |
|---|---|---|---|---|
| CUB ID | CUB | 3 | [63:61] | The target cube inserts its Cube ID number into this field. The requester can use this field for verification and for identifying unique tags per the target cube. |
| Reserved | RES | 19 | [60:42] | Reserved: The host will ignore bits in this field from the HMC except for including them in the CRC calculation. |
| Source Link ID | SLID | 3 | [41:39] | Used to identify the source link for response routing. This value is copied from the corresponding Request header and used for response routing purposes. The host can ignore these bits (except for including them in the CRC calculation.) |
| Reserved | RES | 5 | [38:34] | Reserved: The host will ignore bits in this field from the HMC except for including them in the CRC calculation. |
| Atomic Flag | AF | 1 | [33] | Atomic flag |
| Reserved | RES | 10 | [32:23] | Reserved: The host will ignore bits in this field from the HMC except for including them in the CRC calculation. |
| Tag | TAG | 11 | [22:12] | Tag number uniquely associating this response to a request. |
| Packet length | LNG | 5 | [11:7] | Length of packet in 128-bit FLITs. Includes header, any data payload, and tail. |
| Command | CMD | 7 | [6:0] | Packet command |

TABLE 4

| Name | Field Label | Bit Count | Bit range | Function |
|---|---|---|---|---|
| Cyclic redundancy check | CRC | 32 | [63:62] | Error-detecting code field that covers the entire packet. |
| Return token counts | RTC | 3 | [31:29] | Return token count for transaction-layer flow control. In the response packet tail, the RTC contains an encoded value equaling the returned tokens. The tokens represent incremental available space in the HMC input buffer. |
| Error status | ERRSTAT | 7 | [28:22] | Error status bits |
| Data invalid | DINV | 1 | [21] | Indicates validity of packet payload. Data in packet is valid if DINV = 0 and invalid if DINV = 1. |
| Sequence number | SEQ | 3 | [20:18] | Incrementing value for each packet transmitted. |
| Forward retry pointer | FRP | 9 | [17:9] | Retry pointer representing this packet's position in the retry buffer. |
| Return Retry Pointer | RRP | 9 | [8:0] | Retry pointer being returned for the other side of link. |

According to an example embodiment of the present invention, the reserved bits RES in the request/response packets may be used to carry the PIM instructions (e.g., for the reconfigurable compute). Further, if the reserved bits RES in the request/response packets are not sufficient, the request/response packet definition may be expanded, such that the tail has more bits. The expanded tail bits may then be used to carry the PIM instructions. Accordingly, the response/request packets of, for example, the HMC interface may be modified to transmit the PIM instructions to configure and instruct the base die 102 (e.g., the switches 206 and the ALUs 208) to compute data through the interface 108 between the 3DS memory device 100 and the host 110.

For example, referring back to the example shown in FIGS. 4A to 4C, the steps may include:

(1) Load A, B, C, D (e.g., four LOAD instructions);
(2) X=A+B; Y=C+D (e.g., two ADD instructions);
(3) Z=X+Y (e.g., one ADD instruction); and
(4) Store Z (e.g., one STORE instruction).

Figure 6:
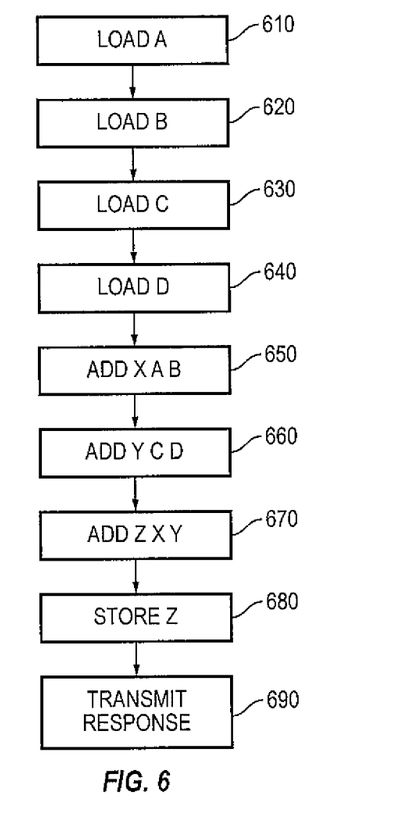
FIG. 6 is a flow diagram illustrating operations of an interface including response and request links, according to an embodiment of the present invention.
Figure 7:
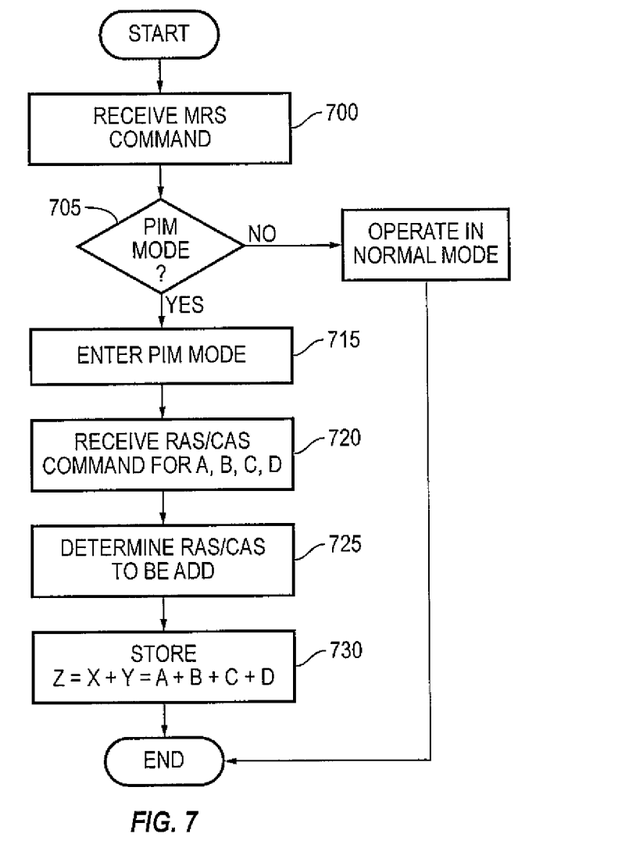
FIG. 7 is a flow diagram illustrating operations of an interface including control and data buses, according to an embodiment of the present invention.

The host may send these instructions in order. Each instruction may be embedded in one request packet. Each request packet may also contain the data and address associated with the instructions. Thus, in this example, as shown in FIG. 6, the sequence may include LOAD A (at block 610), LOAD B (at block 620), LOAD C (at block 630), LOAD D (at block 640), ADD X A B (at block 650), ADD Y C D (at block 660), ADD Z X Y (at block 670), and STORE Z (at block 680).

At the end of the sequence, the memory device may send back a response informing the host that it has finished, and providing the address in which the end result Z has been stored (at block 690).

Alternatively, there may be an instruction called ADD4, which may add four data together. In this case, the host will simply send one packet, for example, ADD4 Z A B C D. Here, there is less overhead, and many PIM operations are transparent to the CPU, so it may be undesirable for the CPU to manage every detail.

However, the present invention is not limited thereto, and there may be various additional definitions depending on the capabilities of the ALUs and/or of the memory device.

FIG. 6 illustrates a flow diagram for an interface including control and data buses, according to an embodiment of the present invention.

When the interface 108 includes the control and data buses, such as the interface for an HBM device, the control bus is unidirectional from the host to the 3DS memory device and the data bus is bidirectional between the host and the 3DS memory device. The control bus transfers address bits and commands from the host to the 3DS memory device. The data bus transfers data to the memory dies from the host (e.g., via WRITE) and transfers data from the memory dies to the host (e.g., via READ).

The commands may include traditional commands (e.g., DRAM access commands, such as READ, WRITE, ACTIVATE, PRECHARGE, REFRESH, etc.), and may include a mode register set command (e.g., MRS command) to configure the 3DS memory device. For example, the MRS command may configure registers of the 3DS memory device to operate in a PIM mode or a normal mode. In the normal mode, the 3DS memory device may operate like a traditional 3DS memory device (e.g., the HBM device) without compute, and interprets the traditional commands (e.g., RAS, CAS, CASW, etc.) as would be expected. On the other hand, in the PIM mode, the 3DS memory device may interpret the traditional commands to have a different meaning. In other words, when the MRS command is received to operate in the PIM mode, the traditional commands (e.g., RAS, CAS, CASW, etc.) may be interpreted by the 3DS memory device as instructions to compute data (e.g., ADD, MULTIPLY, DIVIDE, COMPARE, etc.) via the base die 102 (e.g., ALUs 208).

For example, referring to FIGS. 4A to 4C and 7, the process starts and at block 700, the 3DS memory device receives the MRS command from the host via the interface to configure the 3DS memory device. At block 705, the 3DS memory device determines whether the MRS command includes instructions to operate in the PIM mode. If the determination is no, the 3DS memory device operates in the normal mode at block 710. If the determination is yes, then at block 715, the 3DS memory device is configured to enter the PIM mode. At block 720, the 3DS memory device receives traditional commands (e.g., RAS/CAS) for A, B, C, and D. At block 725, the 3DS memory device determines that the traditional commands (e.g., RAS/CAS) should be interpreted as compute logic (e.g., ADD). At block 730, the 3DS memory device sums the value of A, B, C, and D as X+Y=Z and stores the value of Z (e.g., see FIG. 4). Several traditional commands (e.g., RAS/CAS) may be received depending on the operation.

In some embodiments, the data bus may be repurposed when in the PIM mode to transfer not just data, but also command, address, status, etc. For example, assuming that the compute instructions include ADD4 Z A B C D, a RAS command could be used to represent ADD4, and data bus bits could be used to represent the addresses of A, B, C, and D. After the computation is completed, the data bus can be used to transfer the address of Z back to the host. Similarly, in some embodiments, the compute instructions may include, for example, ADD X A B, in which case, we could use a CAS command to represent ADD, and use the data bus to present the addresses of A and B.

While the examples herein are described with repurposed RAS/CAS commands, the present invention is not limited thereto. For example, other traditional commands (e.g., DRAM commands) could be repurposed as desired, or PIM instructions that are not defined by any of the traditional commands may be defined as desired.

In some embodiments, the MRS command may be utilized to configure the 3DS memory device to exit the PIM mode, and to act as a traditional 3DS memory device (e.g., a normal HBM device). Then, the 3DS memory device may operate as a traditional memory device (e.g., a HBM device) without computing data. However, the present invention is not limited thereto, and in some embodiments, the 3DS memory device may revert back to the normal mode, for example, as a default without further MRS commands, once the compute has completed.

According to one or more example embodiments of the present invention, reconfigurable compute logic may be implemented on the base die of a 3DS memory device. For example, the base die may include program memory and a logic array including a plurality of switches and a plurality of ALUs. The switches may direct data flow and create data paths, and the ALUs may compute the data. Further, an interface between the 3DS memory device and a host may be utilized to configure and command the base die (e.g., the switches and ALUs) to compute data. In some embodiments, the interface may include request/response links (e.g., an HMC interface) to send/receive packetized address/commands/data. In some embodiments, the interface may include control and data buses (e.g., an HBM interface) to configure the 3DS memory device in a PIM mode, and to interpret traditional commands as computation commands. In some embodiments, the interface may include the interface of the HMC device or the HBM device that is modified to transmit PIM instructions for the base die (e.g., the switches and the ALUs on the base die) to compute data.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Although the present invention has been described with reference to the example embodiments, those skilled in the art will recognize that various changes and modifications to the described embodiments may be performed, all without departing from the spirit and scope of the present invention. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims, and their equivalents.

What is claimed is:

1. A 3D-stacked (3DS) memory device comprising:
a base die comprising a plurality of switches configured to direct data flow, and a plurality of arithmetic logic units (ALUs) configured to compute data;
a plurality of memory dies stacked on the base die; and
an interface configured to transfer signals to control the base die, and comprising:
a control bus configured to transmit commands from a host to the base die, the commands comprising a mode register set command (MRS command) to configure the 3DS memory device to operate in a processor in memory (PIM) mode to compute the data by interpreting traditional commands comprising one or more DRAM access commands comprising a "read" command, an "activate" command, a "precharge" command, or a "refresh" command to perform a memory access operation as respective logic commands comprising one or more of an "add" command, a "multiply" command, a "divide" command, a "compare" command, a "shift" command, an "and" command, an "or" command, or an "xor" command; and
a data bus configured to transmit data between the host and the base die, wherein the base die is configured to:
receive, from the host, a traditional command of the traditional commands; and
translate the traditional command into a respective one of the logic commands to perform an arithmetic operation on the data via the ALUs.

2. The device of claim 1, wherein the base die further comprises a program memory, the program memory being configured to be controlled by an external host through the interface, to configure the switches, and to control operations of the ALUs.

3. The device of claim 2, wherein the interface comprises:
a request link configured to transmit a request packet from the host to the base die; and
a response link configured to transmit a response packet from the base die to the host.

4. The device of claim 3, wherein the request packet comprises the configuration instructions and/or commands to instruct the switches and the ALUs to compute the data.

5. The device of claim 4, wherein the request packet comprises reserved bits to be utilized to transmit the configuration instructions and/or the commands to the base die.

6. The device of claim 4, wherein the request packet comprises a header and a tail, the tail comprising bits utilized to transmit the configuration instructions and/or the commands to the base die.

7. The device of claim 1, wherein the base die is configured to perform the traditional command for the memory access operation, when operating in a normal mode.

8. The device of claim 7, wherein the traditional command comprises a DRAM command.

9. The device of claim 1, wherein the base die is configured to interpret the traditional command or the logic command as a CPU instruction.

10. The device of claim 1, wherein the device is configured to interpret a traditional command comprising READ, WRITE, ACTIVATE, PRECHARGE, REFRESH, RAS, CAS, or CASW as compute logic comprising instructions to compute data.

11. A method of operating a 3D-stacked (3DS) memory device comprising a base die comprising a plurality of switches and a plurality of arithmetic logic units (ALUs), a plurality of memory dies stacked on the base die, and an interface configured to control the base die and comprising a control bus configured to transmit commands from a host to the base die, the commands comprising a mode register set command (MRS command) to configure the 3DS memory device to operate in a processor in memory (PIM) mode to compute data by interpreting traditional commands comprising one or more DRAM access commands comprising a "read" command, an "activate" command, a "precharge" command, or a "refresh" command as respective logic commands comprising one or more of an "add" command, a "multiply" command, a "divide" command, a "compare" command, a "shift" command, an "and" command, an "or" command, or an "xor" command, and a data bus configured to transmit data between the host and the base die, the method comprising:
configuring the switches to direct data flow according to configuration instructions;
controlling operations of the ALUs to compute data according to the logic commands; and
storing the computed data in the memory dies,
wherein the base die is configured to receive, from the host, the traditional commands to perform memory access operations, or to translate the traditional commands into the logic commands to perform arithmetic operations on the data via the ALUs.

12. The method of claim 11, wherein the configuration instructions and the logic commands are embedded in a request packet, and the method further comprises:
receiving the request packet through a request link of the interface from a host; and
decoding the request packet to identify the configuration instructions and the logic commands.

13. The method of claim 12, wherein the method further comprises:
transmitting a response packet through a response link of the interface to the host.

14. The method of claim 12, wherein the request packet comprises reserved bits for the configuration instructions and/or the logic commands.

15. The method of claim 12, wherein the request packet comprises a header and a tail, the tail comprising bits for the configuration instructions and/or the logic commands.

16. The method of claim 11, further comprising:
configuring a normal mode;
receiving a second memory command from the host through the control bus; and
performing a memory function according to the second memory command.

17. The method of claim 11, further comprising interpreting one or more of the traditional commands or the logic commands as a CPU instruction.

18. The method of claim 11, further comprising interpreting a traditional command comprising READ, WRITE, ACTIVATE, PRECHARGE, REFRESH, RAS, CAS, or CASW as compute logic comprising instructions to compute data.

19. An interface of a memory device comprising a processor in memory, the interface comprising:
a control bus configured to transfer commands from an external host to the memory device, the commands comprising a mode register set command (MRS command) to configure the memory device to operate in a processor in memory (PIM) mode to compute data by interpreting traditional commands comprising one or more DRAM access commands comprising a "read" command, an "activate" command, a "precharge" command, or a "refresh" command as logic commands comprising one or more of an "add" command, a "multiply" command, a "divide" command, a "compare" command, a "shift" command, an "and" command, an "or" command, or an "xor" command; and
a data bus configured to transfer data between the memory device and the host,
wherein the interface is configured to transfer the commands to set the memory device to operate in a PIM mode to compute the data, and to set the memory device to operate in a normal mode to perform memory functions, and
wherein the memory device is configured to:
translate the traditional memory commands received from the host into the logic commands to compute the data according to the logic commands when in the PIM mode; and to
perform the memory functions according to the traditional memory commands when in the normal mode.

20. The interface of claim 19, wherein the memory device is configured to interpret the traditional command or the logic command as a CPU instruction.

21. The device of claim 19, wherein the memory device is configured to interpret a traditional command comprising READ, WRITE, ACTIVATE, PRECHARGE, REFRESH, RAS, CAS, or CASW as compute logic comprising instructions to compute data.

* * * * *